(12) United States Patent
Brierley et al.

(10) Patent No.: US 7,118,604 B2
(45) Date of Patent: Oct. 10, 2006

(54) NON AZO DISPERSE DYE MIXTURES

(75) Inventors: David Brierley, Oldham (GB); Alan T. Leaver, Manchester (GB); Nigel Hall, Bury (GB); Alan Cunningham, Cologne (DE)

(73) Assignee: DyStar Textilfarben GmbH & Co. Deutschland KG, (DE)

( * ) Notice: Subject to any disclaimer, the term of this patent is extended or adjusted under 35 U.S.C. 154(b) by 80 days.

(21) Appl. No.: 10/627,827

(22) Filed: Jul. 24, 2003

(65) Prior Publication Data

US 2004/0019983 A1    Feb. 5, 2004

(30) Foreign Application Priority Data

Jul. 29, 2002   (GB)   ................................. 0217487.8

(51) Int. Cl.
C09B 67/38 (2006.01)
D06P 3/36 (2006.01)

(52) U.S. Cl. ................................... 8/643; 8/638; 8/922
(58) Field of Classification Search .................... 8/638, 8/643, 529, 532, 533, 922

See application file for complete search history.

(56) References Cited

U.S. PATENT DOCUMENTS 5,759,211 A * 6/1998 Hall ................................ 8/506
6,462,204 B1 * 10/2002 Hall et al. ................... 549/299

FOREIGN PATENT DOCUMENTS

| EP | 1 188 799 A1 | 3/2002 |
|---|---|---|
| WO | WO 95/21958 A1 | 8/1995 |
| WO | WO 97/04031 A1 | 2/1997 |
| WO | WO 00/22048 A1 | 4/2000 |

* cited by examiner

Primary Examiner—Margaret Einsmann
(74) Attorney, Agent, or Firm—Connolly Bove Lodge & Hutz

(57) ABSTRACT

The present invention refers to a dye mixture comprising an azo dye of the formula (I)

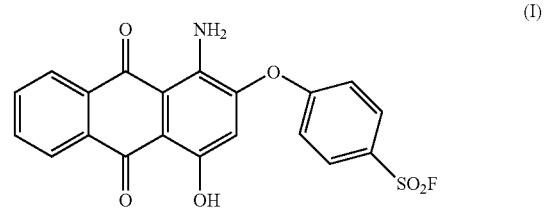

(I)

and one or more dyes of the general formula (II)

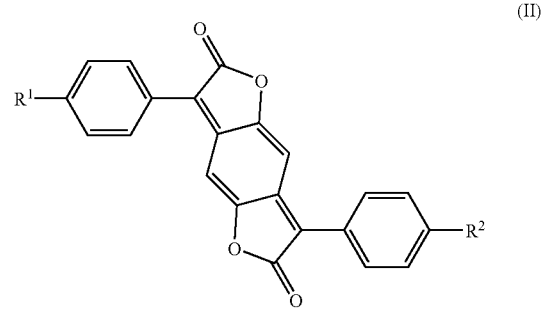

(II)

wherein
$R^1$ and $R^2$ are independently
hydrogen, alkoxy [$OR^3$] or substituted alkoxy [$O(CH_2)_n R^4$], in which
  n can be 1 to 6
  $R^3$ is alkyl or alkenyl each of which can be optionally substituted by a unsubstituted or a substituted saturated or unsaturated 5–, 6–, or 7 -membered heterocyclic or homocyclic residue;
  $R^4$ is a group of the formula (1) or (2)

—$OR^5$ (1)

—$COR^6$ (2)

wherein
$R^5$ is hydrogen for n more than 1, alkyl for n more than 1, alkenyl, aryl, alkoxyalkyl, aryloxyalkyl, carbonylalkyl, carbonylalkenyl, carbonylaryl, carbonylalkoxyalkyl or carbonylaryloxyalkyl;
$R^6$ is alkoxy, alkenyloxy, aryloxy, arylalkoxy, aryloxyalkoxy, alkenyloxyalkyloxy or alkoxyalkoxy, a method for the preparation of such mixtures and a method for colouring a synthetic textile material or fibre blend thereof using such mixtures.

13 Claims, No Drawings

NON AZO DISPERSE DYE MIXTURES

This invention relates to mixtures of disperse non-azo dyes.

Mixed disperse dyes and their use for dyeing polyester and its blends with other fibres such as cellulose, elastane, nylon and wool by normal exhaust dyeing, continuous dyeing and direct printing techniques are already known for example from the documents EP1188799 A1, and WO0022048. However, they have certain application defects, such as for example relatively poor leveling/migration properties, an overly large dependence of the colour yield on varying dyeing parameters in the dyeing process or an insufficient colour build-up on polyester (good colour build-up results from the ability of a dye to provide a proportionally stronger dyeing when used in higher concentrations in the dye bath), or unsatisfactory fastness properties.

However there is a need for disperse dyes which provide dyeings of improved fastness properties, i.e. wash and light fastness properties of dyed polyester or its blends with other fibres such as cellulose, elastane, nylon and wool.

The present invention, then, provides dye mixtures of disperse dyes which provide dyeings of very good wet and light fastness properties on polyester or its blends with other fibres.

The invention accordingly provides dye mixtures comprising one dye of the herein below indicated and defined formula (I)

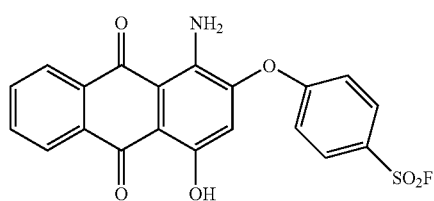

(I)

and one or more, such as two or three, preferably 1 or 2, dyes of the herein below indicated and defined general formula (II)

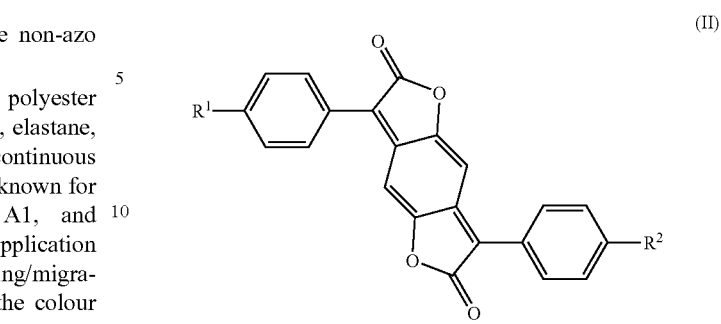

(II)

wherein
R$^1$ and R$^2$ are independently
hydrogen, alkoxy [OR$^3$] or substituted alkoxy [O(CH$_2$)$_n$ R$^4$],
  in which
  n can be 1 to 6
  R$^3$ is alkyl or alkenyl each of which can be optionally substituted by a unsubstituted or a substituted saturated or unsaturated 5-, 6-, or 7-membered heterocyclic or homocyclic residue;
  R$^4$ is a group of the formula (1) or (2)

(1)

(2)

wherein
  R$^5$ is hydrogen for n more than 1, alkyl for n more than 1, alkenyl, aryl, alkoxyalkyl, aryloxyalkyl, carbonylalkyl, carbonylalkenyl, carbonylaryl, carbonylalkoxyalkyl or carbonylaryloxyalkyl;
  R$^6$ is alkoxy, alkenyloxy, aryloxy, arylalkoxy, aryloxyalkoxy, alkenyloxyalkyloxy or alkoxyalkoxy.

Alkyl R may be straight-chain or branched and is in particular C$_1$–C$_4$–, such as methyl, ethyl n-propyl, isopropyol, n-butyl, isobutyl, sec-butyl or tert-butyl. Methyl and ethyl are preferred. The same logic applies to (C$_1$–C$_4$)-alkoxy groups. Alkenyl R is in particular C$_2$–C$_4$– such as ethenyl, propenyl, butenyl.

Specific structures which would be of interest covered by the general formula (II) include for example:

| Formula | R$^1$ | R$^2$ |
|---|---|---|
| (II-1) | H | |
| (II-2) | | |
| (II-3) | ditto | H |
| (II-4) | | ditto |

-continued

| Formula | R¹ | R² |
|---------|-----|-----|
| (II-5) | isopropyl-O-* | ditto |
| (II-6) | propyl-O-* | ditto |
| (II-7) | HO-CH₂CH₂CH₂-O-* | ditto |
| (II-8) | (tetrahydrofuran-2-yl)methyl-O-* | ditto |
| (II-9) | CH₃O-CH₂CH₂-O-C(=O)-CH₂-O-* | ditto |
| (II-10) | CH₃O-CH₂-O-C(=O)-CH₂-O-* | ditto |
| (II-11) | CH₃O-CH(CH₃)-O-C(=O)-CH₂-O-* | ditto |
| (II-12) | CH₃O-CH₂CH₂-O-C(=O)-CH₂-O-* | propyl-O-* |
| (II-13) | CH₃O-CH₂CH₂-O-C(=O)-CH₂-O-* | ethyl-O-* |
| (II-14) | CH₃O-CH₂CH₂-O-C(=O)-CH₂-O-* | isopropyl-O-* |

A preferred embodiment of the invention is a mixture comprising dyestuff according to formula (I) and at least one of the following dyestuffs of the formula (II-1), (II-9), (II-10) or (II-11), or a mixture comprising dyestuff (I) and one or more dyestuffsla of the formula (II-2), (II-12), (II-13), (II-14), or a mixture comprising dyestuff (I) and one or more dyestuffs of the formula (II-3), (II-4), (II-5), (II-6), (II-7), (II-8).

The dye of the general formula (I) is present in the mixtures in an amount of from 5 to 95% by weight, preferably of from 75 to 90% by weight, and the dye, respectively dyes of the general formula (II) are present in the mixtures in an amount of from 95 to 5% by weight, preferably of from 10 to 25% by weight.

The dyes according to the general formula (I) are known from WO-9521958, the dyes of the general formula (II) are partially known from WO 9704031.

Mixtures embodying the invention can be prepared, for example, by mixing the dye components in the required amounts. Suitable mixing methods include Co-crystallisation Typically, the dyes are dissolved in a hot solvent, for example, by placing the dyes in a suitable solvent and heating up to the reflux temperature of the solvent until the dyes are dissolved, thereafter filtering to provide a solution, and then allowing the solution to cool and crystals to form. The resultant mixture may then undergo further processing, such as milling and spray drying. Examples of suitable solvents for this process are organic solvents such as aromatic hydrocarbons, chlorinated hydrocarbons, aliphatic hydrocarbons, alicyclic hydrocarbons, alcohols, amides, sulphoxides, esters, ketones and ethers. Specific examples of organic solvents are toluene, ethyl cellosolve, acetone, chlorobenzene, pyridine, dimethyl formamide, dimethylsulphoxide, ethyl acetate, benzene, tetrahydrofuran and cyclohexane.

Co-crystallisation is generally unsuitable for mixtures containing more than two components.

Co-milling
(a) The dyes are mixed and then milled together to give an intimate blend which is then spray dried to give a solid mixture; or
(b) each dye is milled separately and then mixed in the required ratio before spray drying.

Dry Blending

Each dye is spray dried separately and then mixed in the required ratio by a dry blending process.

Mixtures embodying the invention provide especially useful disperse dyes valuable for colouring synthetic textile materials such as polyester, microfibre polyester and fibre blends thereof such as polyester-cellulose, polyester-wool, polyester-polyurethane or polyester-nylon, by exhaust dyeing, padding or printing, and may be formed into dispersions for this purpose. They may also be used in, for example, ink jet printing of textiles and non-textiles, dye diffusion, thermal transfer printing and in the colouration of plastics.

A particular aspect of the invention provides a composition comprising a mixture of dye (I) and (II), and additionally, at least one further ingredient conventionally used in colouring applications such as a dispersing agent and optionally a surfactant or wetting agent. The composition typically comprises from 1% to 65%, preferably 10 to 60%, more preferably 20 to 55%, of the total dye mixture in a solid medium.

Typical examples of dispersing agent are lignosulphonates, naphthalene sulphonic acid/formaldehyde condensates and phenol/cresol/sulphanilic acid/formaldehyde condensates, typical examples of wetting agent are alkyl aryl ethoxylates which may be sulphonated or phosphated and typical example of other ingredients which may be present are inorganic salts, de-foamers such as mineral oil or nonanol, organic liquids and buffers. Dispersing agents may be present at from 10% to 200% on the weight of the dye mixtures. Wetting agents may be used at from 0% to 20% on the weight of the dye mixtures.

The compositions may be prepared by bead milling the dye mixture with glass beads or sand in an aqueous medium. The compositions may have further additions of dispersing agents, fillers and other surfactants and may be dried, by a technique such as spray drying, to give a solid composition comprising from 5% to 65% of dyestuff.

According to another aspect, the invention provides a process for colouring a synthetic textile material or fibre blend thereof which comprises applying to the synthetic textile material or fibre blend a mixture comprising a dye of the formula (I) and at least one dye of the formula (II).

The synthetic textile material may be selected from aromatic polyester, especially polyethylene terephthalate, polyamide, especially polyhexamethylene adipamide, secondary cellulose acetate, cellulose triacetate, and natural textile materials, especially cellulosic materials and wool, or blends of polyester and polyurethane, or polyester and nylon. An especially preferred textile material is an aromatic polyester or fibre blend thereof with fibres of any of the above mentioned textile materials. Especially preferred fibre blends include those of polyester-cellulose, such as polyester-cotton, and polyester-wool. The textile materials or blends thereof may be in the form of filaments, loose fibres, yarn or woven or knitted fabrics.

The mixtures of dyes of formulae (I) and (II) may be applied to the synthetic textile materials or fibre blends by processes which are conventionally employed in applying disperse dyes to such materials and fibre blends.

Suitable process conditions may be selected from the following
(i) exhaust dyeing at a pH of from 4 to 6.5, at a temperature of from 125° C. to 140° C. for from 10 to 120 minutes and under a pressure of from 1 to 2 bar, a sequestrant optionally being added;
(ii) continuous dyeing at a pH of from 4 to 6.5, at a temperature of from 190° C. to 225° C. for from 15 seconds to 5 minutes, a migration inhibitor optionally being added;
(iii) direct printing at a pH of from 4 to 6.5, at a temperature of from 160° C. to 185° C. for from 4 to 15 minutes for high temperature steaming, or at a temperature of from 190° C. to 225° C. for from 15 seconds to 5 minutes for bake fixation with dry heat or at a temperature of from 120° C. to 140° C. and 1 to 2 bar for from 10 to 45 minutes for pressure steaming, wetting agents and thickeners (such as alginates) of from 5 to 100% by weight of the dye optionally being added;
(iv) discharge printing (by padding the dye on to the textile material, drying and overprinting) at a pH of from 4 to 6.5, migration inhibitors and thickeners optionally being added;
(v) carrier dyeing at a pH of from 4 to 6.5, at a temperature of from 95° C. to 100° C. using a carrier such as methylnaphthalene, diphenylamine or 2-phenylphenol, sequestrants optionally being added; and
(vi) atmospheric dyeing of acetate, triacetate and nylon at a pH of from 4 to 6.5, at a temperature of 85° C. for acetate or at a temperature of 90° C. for triacetate and nylon for from 15 to 90 minutes, sequestrants optionally being added.

In all the above processes, the dye mixture is applied as a dispersion comprising from 0.001% to 20%, preferably from 0.005 to 16%, of the dye mixture in an aqueous medium.

In addition to the above-mentioned application processes, the dye mixtures may be applied to synthetic textile materials and fibre blends by ink-jet printing, the substrates optionally having been pre-treated to aid printing. For ink-jet applications, the application medium may comprise water and a water-soluble organic solvent, preferably in a weight ratio of 1:99 to 99:1, more preferably 1:95 to 50:50 and especially in the range 10:90 to 40:60. The water-soluble organic solvent preferably comprises a C1-4-alkanol, especially methanol or ethanol, a ketone, especially acetone or methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl) sulphone or mixtures thereof.

The dye mixtures may also be applied to textile materials using supercritical carbon dioxide, in which case the dye formulating agents may optionally be omitted.

Embodiments of the present invention will now be described in more detail with reference to the following Examples, in which parts are by weight unless otherwise stated.

EXAMPLE 1

A mixture of 27.77 parts of dye (I) and 4.53 parts of dyestuffs according to formula (II-1) was prepared by mixing the two dyes together and milling them as a 40% aqueous slurry with 20 parts of a high temperature stable dispersing agent until the dye particle size (mean diameter) was in the range 0.1–5 microns.

This dispersion was standardised to a solid brand containing 32.3% of the mixture and 67.7% dispersing agent, by the addition of 47.7 parts of a temperature stable dispersing agent and drying to either a grain or powder form in a spray dryer.

A dyebath for the exhaust dyeing of polyester in piece form was prepared by adding 1.8 ml of an aqueous dispersion of the solid brand (1 g dye in 100 ml water at 40–50° C.) to 57 ml of deionised water and 1.2 ml of buffer solution. To this dyebath was added a 5 g piece of polyester and the whole was held for 45 minutes at 130° C. in a high temperature dyeing machine. After rinsing with water and a reduction clearing treatment, the material was dyed a bright red shade with excellent wet and light fastness. An interesting feature of the mixture is its good leveling/migration performance during the dyeing process.

EXAMPLE 2

A mixture of 31.19 parts of dye (I) and 12 parts of dyestuff (II-1) was prepared by mixing the two dyes together and milling them as a 40% aqueous slurry with 25 parts of a high temperature stable dispersing agent until the dye particle size (mean diameter) was in the range 0.1–5 microns.

This dispersion was standardised to a solid brand containing 43.19% of the mixture and 56.81% dispersing agent, by the addition of 31.81 parts of a temperature stable dispersing agent and drying to either a grain or powder form in a spray dryer.

A dyebath for the exhaust dyeing of polyester in piece form was prepared by adding 1.2 mls of an aqueous dispersion of the solid brand (1 g dye in 100 ml water at 40–50° C.) to 57.5 ml of de-ionised water and 1.2 ml of buffer solution. To this dyebath was added a 5 g piece of polyester and the whole was held for 45 minutes at 30° C. in a high temperature dyeing machine. After rinsing with water and a reduction clearing treatment, the material was dyed a bright red shade with excellent wet and light fastness. An interesting feature of the mixture is its good leveling/migration performance during the dyeing process.

Further dye mixtures based on dye (I) and a dyestuff corresponding to general formula (II) were applied to polyester under the exhaust dyeing conditions described in Examples 1 and 2. Again after the normal clearing treatments, the dyeings obtained were bright red in shade and gave excellent wet and light fastness. All the mixtures evaluated exhibited good leveling/migration performance during the dyeing process.

| Example | % Dye I | % Structure (II-1) | % Structure (II-9) | % Structure (II-10) | % Structure (II-11) |
|---|---|---|---|---|---|
| 3 | 89 | — | 11 | — | — |
| 4 | 87 | 13 | — | — | — |
| 5 | 85 | 15 | — | — | — |
| 6 | 83 | — | — | 17 | — |
| 7 | 81.5 | — | — | — | 18.5 |
| 8 | 80 | — | 20 | — | — |
| 9 | 78.5 | — | — | 21.5 | — |
| 10 | 76.5 | — | — | — | 23.5 |
| 11 | 75 | — | 25 | — | — |
| 12 | 73 | 27 | — | — | — |
| 13 | 71 | 29 | — | — | — |

EXAMPLE 14

A mixture of 25.81 parts of dye (I), 1.52 parts of dye of formula (II-1), 4.91 parts of dye of formula (II-2) and 2.32 parts of dye of formula (II-3) was prepared by mixing the four dyes together and milling them as a 40% aqueous slurry with 20 parts of a high temperature stable dispersing agent until the dye particle size (mean diameter) was in the range 0.1–5 microns.

The dispersion was standardised to a solid brand containing 34.64% of the mixture and 65.36% dispersing agent, by the addition of 45.36 parts of a temperature stable dispersing agent and drying to either a grain or powder form in a spray dryer. This product is especially suitable for the exhaust dyeing of poplyester(including microfibre and weight reduced polyester), polyester/cellulose polyester/elastane and polyester/wool blends and can also be used for continuous dyeing and direct printing.

A dyebath for the exhaust dyeing of polyester in piece form was prepared by adding 1.5 ml of an aqueous dispersion of the solid brand (1 g dye in 100 ml water at 40–50° C.) to 57.3 ml of deionised water and 1.2 ml of buffer solution. To this dyebath was added a 5 g piece of polyester and the whole was held for 45 minutes at 130° C. in a high temperature dyeing machine.

After rinsing with water and a reduction clearing treatment, the material was dyed a bright bluish red shade with excellent wet and light fastness. An interesting feature of the mixture is its good leveling/migration performance during the dyeing process.

Further examples which illustrate the invention are given in the following table:

| Example | 15 | 16 | 17 | 18 | 19 | 20 | 21 | 22 | 23 | 24 |
|---|---|---|---|---|---|---|---|---|---|---|
| % dye (I) | 65 | 67 | 70 | 72 | 74 | 76 | 78 | 80 | 82 | 83 |
| % dye (II-1) | 5.5 | — | — | — | 5 | 4.5 | — | — | — | — |
| % dye (II-2) | 20 | — | — | — | 14.5 | 13.5 | — | — | — | — |
| % dye (II-3) | 9.5 | — | — | — | 6.5 | 6 | — | — | — | — |
| % dye (II-4) | — | 9 | — | — | — | — | — | — | 5.5 | — |
| % dye (II-5) | — | — | 8.5 | — | — | — | — | — | — | 5 |
| % dye (II-6) | — | — | — | 9 | — | — | — | — | — | — |
| % dye (II-7) | — | — | — | — | — | — | 7.5 | — | — | — |
| % dye (II-8) | — | — | — | — | — | — | — | 6.5 | — | — |
| % dye (II-9) | — | 5 | — | — | — | — | — | 2.5 | 2 | — |
| % dye (II-10) | — | — | 4.5 | — | — | — | 3 | — | — | 2 |
| % dye (II-11) | — | — | — | 4 | — | — | — | — | — | — |
| % dye (II-12) | — | 19 | — | — | — | — | — | 11 | 10.5 | — |
| % dye (II-13) | — | — | 17 | — | — | — | 11.5 | — | — | 10 |
| % dye (II-14) | — | — | — | 15 | — | — | — | — | — | — |

The invention claimed is:

1. Dye mixture comprising at least one dye of the formula (I)

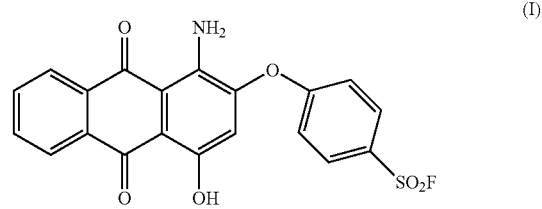

and one or more of the formula (II)

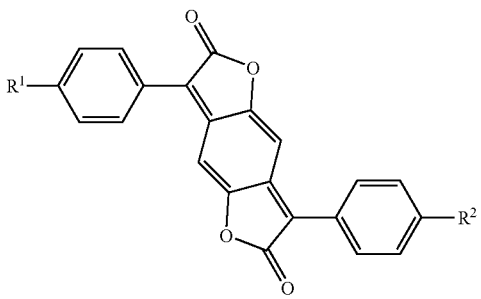 (II)

wherein
R¹ and R² are independently hydrogen, OR³ or O(CH$_2$)$_n$ R⁴,
in which n is 1 to 6
R³ is alkyl;
R⁴ is -COR⁶ wherein;
R⁶ is alkoxyalkoxy.

2. The dye mixture according to claim 1, wherein the ratio by weight of dye (I):
dye (II) is from 5 to 95:95 to 5.

3. The dye mixture according to claim 1, wherein the ratio by weight of dye (I):
dye (II) is from 75 to 90:25 to 10.

4. The dye mixture according to claim 1, wherein two or three of the dyes of the formula II are used.

5. The dye mixture according to claim 1, wherein one or two of the dyes of the formula II are used.

6. A process for the preparation of the dye mixture according to claim 1, comprising mixing the dye components.

7. A composition comprising the dye mixture according to claim 1, and at least one dispersing agent, surfactant or wetting agent.

8. A process for coloring a synthetic textile material or fibre blend thereof, which comprises applying to said synthetic textile material or said fibre blend the dye mixture according to claim 1.

9. The process according to claim 8, wherein the synthetic material or fibre blend thereof is a polyester, polyester-cellulose, polyester-wool, polyester-polyurethane, or polyester-nylon blend.

10. The dye mixture as claimed in claim 1, wherein R¹ or R² is H.

11. The dye mixture as claimed in claim 1, wherein R¹ or R² is H and the R¹ or R² that is not H is a -O(CH$_2$)$_n$ R⁴.

12. The dye mixture as claimed in claim 11, wherein the R¹ or R² that is not H is CH$_3$CH$_2$O(CH$_2$)$_2$OCOCH$_2$O- or CH$_3$O(CH$_2$)$_x$OCOCH$_2$O wherein x is 1 or 2.

13. The dye mixture as claimed in claim 1, wherein the R¹ or R² is -O(CH$_2$)$_2$ CH$_3$ or -OCH$_2$CH$_3$.

* * * * *